United States Patent
Travis

(10) Patent No.: US 10,145,482 B2
(45) Date of Patent: Dec. 4, 2018

(54) FRANGIBLE VALVE

(71) Applicant: Raytheon Company, Waltham, MA (US)

(72) Inventor: Robert D. Travis, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/665,254

(22) Filed: Jul. 31, 2017

(65) Prior Publication Data

US 2017/0356558 A1    Dec. 14, 2017

Related U.S. Application Data

(62) Division of application No. 14/167,910, filed on Jan. 29, 2014.

(51) Int. Cl.
*F16K 17/40* (2006.01)

(52) U.S. Cl.
CPC ....... *F16K 17/403* (2013.01); *Y10T 137/0379* (2015.04); *Y10T 137/1632* (2015.04)

(58) Field of Classification Search
CPC ..... F16K 17/40; F16K 17/403; B60R 21/272; Y10T 137/0379; Y10T 137/1632
USPC ............................................. 137/68.11–68.3
See application file for complete search history.

(56) References Cited

U.S. PATENT DOCUMENTS

| | | | |
|---|---|---|---|
| 1,854,477 A | 4/1932 | McKissick | |
| 2,947,315 A | 8/1960 | Connell | |
| 2,997,051 A | 8/1961 | Williams | |
| 3,093,151 A | 6/1963 | Merkowitz | |
| 3,101,733 A | 8/1963 | Lord | |
| 3,116,747 A | 1/1964 | Cowles et al. | |
| 3,158,165 A * | 11/1964 | Benson | F16K 13/04 137/234.5 |
| 3,202,162 A | 8/1965 | Eckardt et al. | |
| 3,260,272 A | 7/1966 | Eckardt | |
| 3,472,284 A | 10/1969 | Hosek | |
| 3,474,809 A | 10/1969 | Gordon | |
| 3,494,370 A | 2/1970 | Wahl et al. | |
| 3,548,848 A | 12/1970 | Stichling | |
| 3,568,448 A | 3/1971 | Webb, Jr. | |
| 3,788,667 A | 1/1974 | Vancil | |
| 3,810,485 A * | 5/1974 | Gawlick | F16K 13/06 137/71 |
| 3,983,892 A | 10/1976 | Hardesty | |
| 3,989,057 A | 11/1976 | Muddiman | |
| 4,003,395 A | 1/1977 | Tyler | |

(Continued)

OTHER PUBLICATIONS

Conax, "Con-O-cap", US Trademark 745,789, Registered Feb. 26, 1963, 4 pages.

*Primary Examiner* — Minh Le

(57) ABSTRACT

A frangible valve is disclosed. The frangible valve can include an outer portion operable to form a pressure boundary for a pressure vessel. The frangible valve can also include an inner portion integrally formed with the outer portion and having a central region and a separation region about a perimeter of the central region proximate the outer portion. The separation region can have a thickness less than a thickness of the central region and can be configured to break at a predetermined fluid pressure inside the pressure vessel to vent pressure from the pressure vessel.

19 Claims, 5 Drawing Sheets

(56) References Cited

U.S. PATENT DOCUMENTS

| | | | |
|---|---|---|---|
| 4,064,003 A * | 12/1977 | Newton | F22B 1/063 |
| | | | 137/68.28 |
| 4,072,160 A | 2/1978 | Hansen | |
| 4,146,047 A | 3/1979 | Wood et al. | |
| 4,287,904 A | 9/1981 | Kushner et al. | |
| 4,288,005 A | 9/1981 | Soo-Hoo | |
| 4,508,133 A | 4/1985 | Hamid | |
| 4,579,136 A | 4/1986 | Oman et al. | |
| 4,607,664 A | 8/1986 | Carney et al. | |
| 4,970,936 A | 11/1990 | Denker et al. | |
| 5,005,722 A | 4/1991 | Short, III et al. | |
| 5,033,510 A | 7/1991 | Huber | |
| 5,609,362 A * | 3/1997 | Sparks | B60R 21/264 |
| | | | 280/736 |
| 5,620,204 A * | 4/1997 | Frey | B60R 21/264 |
| | | | 280/737 |
| 5,632,505 A | 5/1997 | Saccone et al. | |
| 5,664,804 A * | 9/1997 | Saccone | B60R 21/264 |
| | | | 137/68.13 |
| 5,711,547 A * | 1/1998 | Blumenthal | B60R 21/264 |
| | | | 222/5 |
| 5,720,495 A | 2/1998 | Faigle et al. | |
| 5,845,669 A * | 12/1998 | Ross | E21B 23/04 |
| | | | 137/68.3 |
| 6,619,380 B1 * | 9/2003 | Hartman | F01P 11/0276 |
| | | | 137/68.19 |
| 6,629,703 B2 | 10/2003 | Horton et al. | |
| 6,637,448 B2 | 10/2003 | Naab et al. | |
| 7,350,535 B2 * | 4/2008 | Liepold | A61M 39/10 |
| | | | 137/553 |
| 7,784,827 B2 | 8/2010 | Smith et al. | |
| 2001/0027807 A1 | 10/2001 | Morishita et al. | |
| 2005/0067010 A1 | 3/2005 | Henderson et al. | |
| 2010/0012211 A1 | 1/2010 | Coscarella | |
| 2010/0282330 A1 | 11/2010 | Luther et al. | |

\* cited by examiner

FRANGIBLE VALVE

CROSS-REFERENCE TO RELATED APPLICATIONS

This is a divisional application of U.S. patent application Ser. No. 14/167,910, filed Jan. 29, 2014 entitled "Frangible Valve," which application is incorporated by reference herein in its entirety.

BACKGROUND

Highly pressurized gas bottles/vessels contain an immense amount of potential energy, and accordingly, there are numerous safety codes in place affecting their design and transportation. A large percentage of development costs are attributable to gaining Department of Transportation (DOT) approval. The general requirement is "vent-before-burst" in the event a vessel was to undergo incineration during a transportation-related fire. There are passive and semi-active means to achieve "vent-before-burst." Some designs use ductile tubing, which is designed to yield under increasing pressure, and not fail in a brittle manner. Other designs employ rupture diaphragms that include a membrane designed to fail at a predetermined differential pressure. Another design utilizes a self-igniting pyrotechnic squib, which activates an integral valve to vent a vessel at a temperature well below burst temperature/pressure of the vessel.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
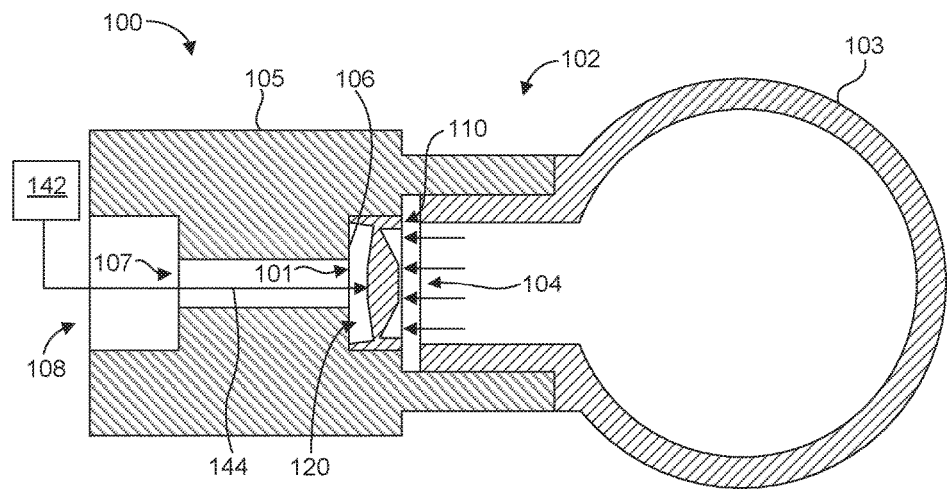
FIG. 1 is an example illustration of a frangible valve system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although previous "vent-before-burst" designs have been serviceable, they do have drawbacks. For example, use of ductile tubing, due to its lower tensile strength, will require use of a thicker walled tubing, thus resulting in increased vessel weight. In addition, numeric quantification of ductile material burst designs can be quite complex, adding a layer of uncertainty and doubt when introduced into the DOT approval process. Vessel proofing can be problematic as well for low-yield strength materials in that ductile material can balloon and diaphragms can rupture. Furthermore, self-igniting pyrotechnic squibs are not readily available and can be prohibitively expensive. Thus, there is a need for a "vent-before-burst" vessel design that can inexpensively reduce or maintain a low pressure vessel weight and simplify DOT approval.

Accordingly, a frangible valve is disclosed that allows the use of high strength, low ductility material to maintain a low pressure vessel weight. In one aspect, the frangible valve provides a simple "by the numbers" area/material strength calculation to achieve pressure relief at a given pressure, thus simplifying justification for DOT approval. The frangible valve can include an outer portion operable to form a pressure boundary for a pressure vessel. The frangible valve can also include an inner portion integrally formed with the outer portion and having a central region and a separation region about a perimeter of the central region proximate the outer portion. The separation region can have a thickness less than a thickness of the central region and can be configured to break at a predetermined fluid pressure inside the pressure vessel to vent pressure from the pressure vessel.

A frangible valve system is further disclosed. The system can include a pressure vessel and a frangible valve. The frangible valve can have an outer portion forming a pressure boundary for the pressure vessel. The frangible valve can also have an inner portion integrally formed with the outer portion and having a central region and a separation region about a perimeter of the central region proximate the outer portion. The separation region can have a thickness less than a thickness of the central region and can be configured to break at a predetermined fluid pressure inside the pressure vessel to vent pressure from the pressure vessel.

One embodiment of a frangible valve system 100 is illustrated in FIG. 1. The system 100 can comprise a frangible valve 101 and a pressure vessel 102. As described further herein, the frangible valve 101 can be configured to maintain pressurized material within the pressure vessel 102 up to a predefined pressure, above which a portion of the frangible valve will break, thus "opening" the frangible valve to vent pressurized material from the pressure vessel 102. Thus, in one aspect, the primary function of the frangible valve 101 can be to provide overpressure relief. The pressure vessel 102 can include a tank 103, canister, pipe, bottle, or any other type of structure configured to contain a pressurized fluid. For example, the pressure vessel 102 can be configured as a pre-charged cryogenic gas vessel. The tank 103 can have an opening 104 whereby pressurized contents can exit the tank 103. The pressure vessel 102 can also include a valve housing 105 that can be configured to couple with the tank 103 and support the frangible valve 101, such as with a valve seat 106. The valve housing 105 can also include a fluid port 107 and an outlet port 108, which can facilitate coupling with a hose, pipe, or other structure to receive pressurized material from the tank 103 when the frangible valve 101 is open. In one aspect, the outlet port can facilitate venting to atmosphere in the event that the frangible valve 101 has opened.

Figure 2:
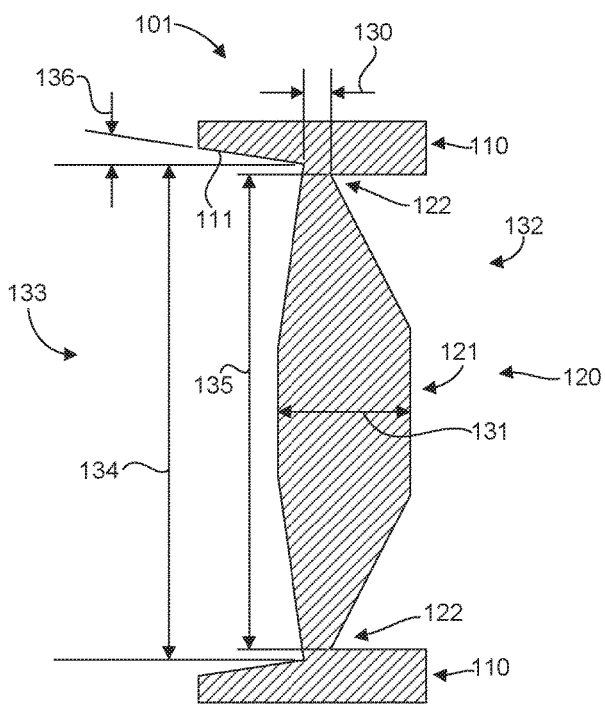
FIG. 2 is an illustration of a frangible valve of the frangible valve system of FIG. 1.
Figure 3:
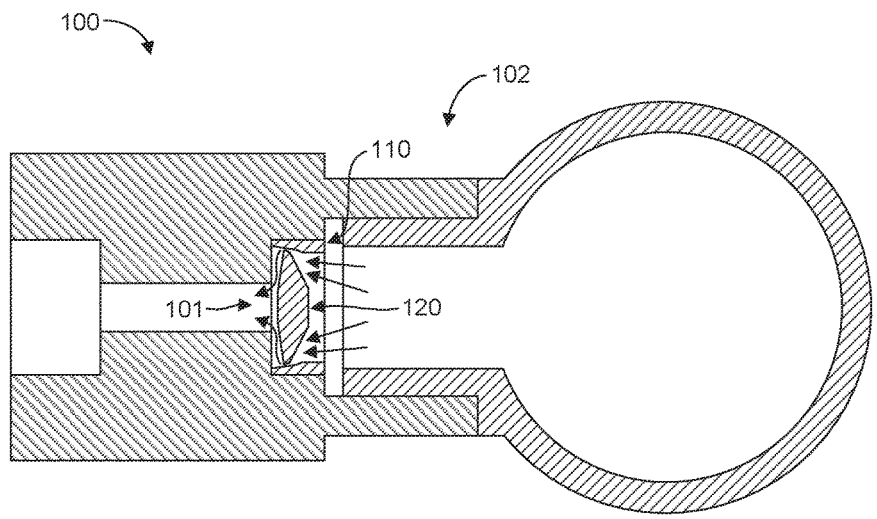
FIG. 3 is an illustration of the frangible valve system of FIG. 1 when the frangible valve is opened.

With reference to FIG. 2, and continued reference to FIG. 1, the frangible valve 101 can have an outer portion 110 that can form a pressure boundary for the pressure vessel 102. For example, outer portion 110 and the valve seat 106 can be sealed, such as by welding, to maintain pressure inside the pressure vessel 102. The frangible valve 101 can also include an inner portion 120 integrally formed with the outer portion 110 and having a central region 121 and a separation region 122 about a perimeter of the central region 121 proximate the outer portion 110. The separation region 122 can be configured to break at a predetermined fluid pressure inside the pressure vessel 102, thus "opening" the frangible valve 101 to vent pressure from the pressure vessel 102 (as shown in FIG. 3). It should be noted that the frangible valve 101 is opened entirely due to fluid pressure differential and not due to the presence of a structural component in contact with a portion of the valve to mechanically facilitate opening of the valve. Moreover, it should be noted that the outer portion 110 of the frangible valve 101 does not move as a result of increasing pressure, as doing so would tend to negate the effects of the increasing pressure that would otherwise cause the separation region to break or fail.

In one aspect, the outer portion 110 can comprise an annular configuration. In another aspect, the inner portion 120 can comprise a disk configuration, having a greater thickness in the central region 121 than outward toward the separation region 122. For example, as shown in FIG. 2, the separation region 122 can have a thickness 130 less than a thickness 131 of the central region 121. The greater thickness of the central region 121 can ensure that the central region 121 will not substantially deflect under increasing pressure, which may inhibit the separation region 122 from breaking or failing at the predetermined pressure. In one aspect, a front or pressure side 132 and/or a back side 133 opposite the front or pressure side 132 of the frangible valve can be configured to form a reduced shear ring, which can be designed to fail or shear at the separation region 122 when pressure force on the inner portion 120 exceeds material strength of the frangible valve 101. This configuration can provide a simple, "by the numbers" inner portion area/material strength calculation to achieve pressure relief of the pressure vessel 102, which can simplify justification for DOT approval. In addition, because the frangible valve 101 provides a simple, dedicated, highly predictable pressure relief function, the tank 103 need not fail in a ductile manner (to vent-before-burst). Thus, tank designs can be improved to take advantage of high strength, low ductility material, which can reduce or maintain a low weight of the pressure vessel 102.

In one aspect, the outer portion 110 can be configured to facilitate unobstructed movement of the inner portion 120 upon breakage. For example, an inner diameter 134 of the outer portion 110 on the back side 133 of the frangible valve 101 can be equal to, or greater than, an outer diameter 135 of the inner portion 120 as defined by features on the front side 132 of the frangible valve 101. In a particular aspect, the outer portion 110 can further (e.g., in addition to comprising an equal to, or greater inner diameter 134) be configured to include an expanding taper portion 111 at an angle 136 to facilitate unrestricted movement of the inner portion 120 relative to the outer portion 110 once the frangible valve 101 has "opened," which can also facilitate the passage of pressurized fluid between the inner portion 120 and the outer portion 110 as the fluid escapes the tank 103.

It will be recognized by those skilled in the art that the inner portion 120 is not intended to seal against the valve seat 106 upon breakage. Indeed, the inner portion 120 can be configured so as to prevent it from bottoming against the valve seat, thus inhibiting flow through fluid port 107. In one aspect, and although not shown, the frangible valve 101 may comprise one or more through holes or fluid passageways formed in the inner portion 120 to prevent blockage of fluid flow through fluid port 107, which through holes or fluid passageways can be similar in function to the fluid passageway 228 discussed below and shown in FIG. 7.

Figure 4:
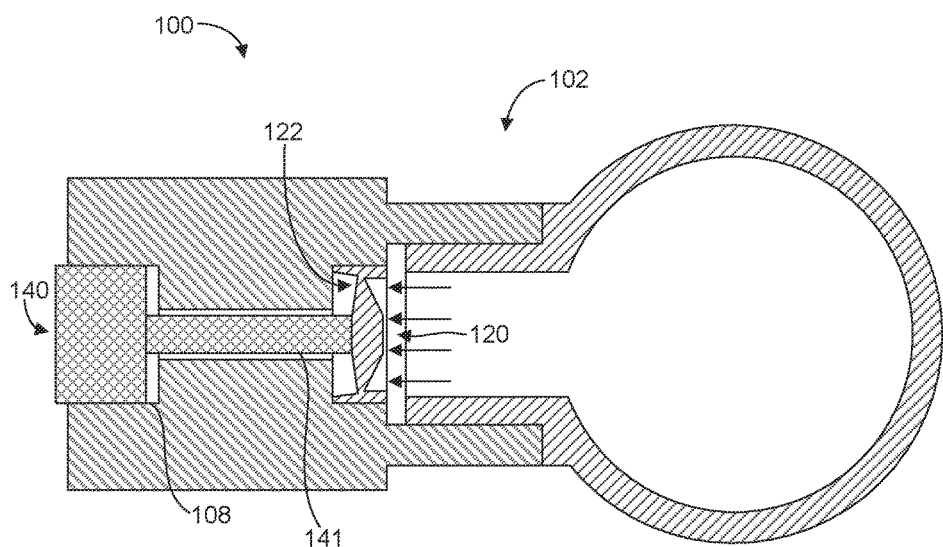
FIG. 4 is an illustration of the frangible valve system of FIG. 1 with a proofing support tool.

In one aspect, as illustrated in FIG. 4, the system 100 can include a proofing support tool 140 that can be utilized whenever it is desirable to prevent the frangible valve 101 from opening, such as during proof or pressure testing the pressure vessel 102. The proofing support tool 140 can be configured to support or shore up the inner portion 120 of the frangible valve 101 and prevent the inner portion 120 from moving in order to prevent yielding or breakage of the separation region 122 when the pressure in the pressure vessel 102 is greater than the predetermined fluid pressure, which would otherwise cause the separation region 122 to break or fail. For example, the proofing support tool 140 can include an extension portion 141 configured to extend through the outlet port 108 to support the inner portion 120, and to exert a pressure or force on the backside 133 of the frangible valve 101. In one aspect, the proofing support tool 140 can be configured to have a threaded engagement with the outlet port 108, although the proofing support tool 140 can be coupled with the valve housing 105 or otherwise supported in any suitable manner. The use of the proofing support tool 140 can greatly simplify proofing procedures and remove any pre-yield questions pertaining to proofing or autofrettage in the case of composite overwrapped vessels, which is a metal fabrication technique that subjects a pressure vessel to enormous pressure, causing internal portions of the part to yield and results in internal compressive residual stresses.

In an alternative embodiment, rather than a mechanical solution as provided by the proofing support tool 140, it is contemplated that fluid or gas pressure from a pressurized source can be used to provide the appropriate pressure to the inner portion 120 of the frangible valve 101 in a similar manner as provided by the proofing support tool 140. Such a fluid or gas solution is illustrated in FIG. 1. Specifically, a pressurized gas or fluid source 142 can be configured to supply a gas or fluid and a corresponding pressure 144 to the back side 133 of the frangible valve 101, as depicted by the arrows opposing the pressure in the pressure vessel 102.

Figure 5:
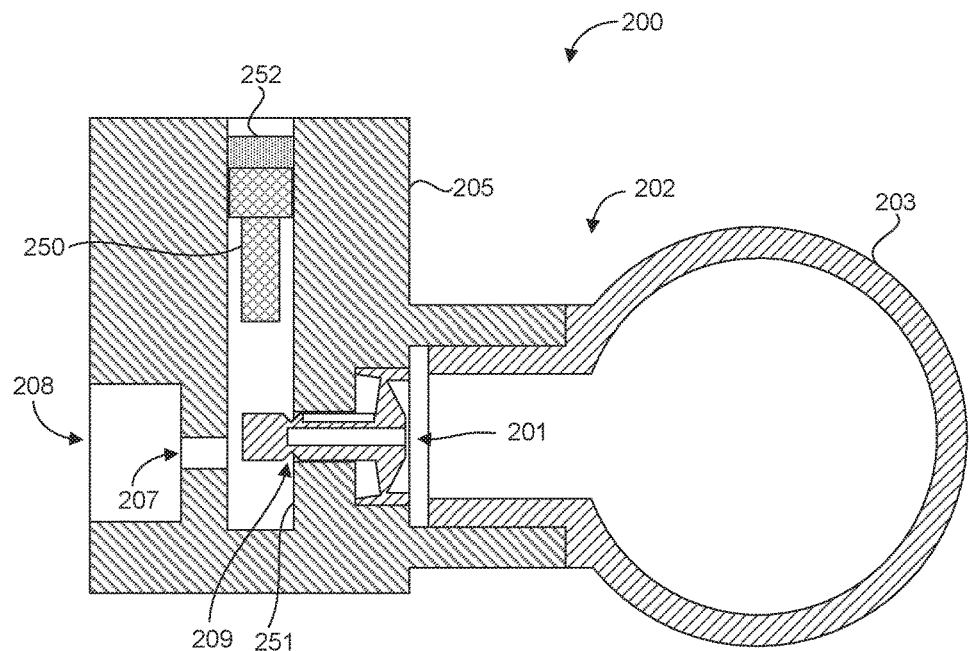
FIG. 5 is an example illustration of a frangible valve system in accordance with another embodiment of the present invention.

FIG. 5 illustrates a frangible valve system 200, in accordance with another example of the present disclosure. The system 200 can be configured as a dual purpose or dual acting valve system. For example, as described further below, the frangible valve system 200 can be configured to open via active and passive mechanisms, and includes separate and distinct features and structures that facilitate the different valve opening mechanisms. The frangible valve system 200 has some similarities to the frangible valve system 100 of FIG. 1. For example, the system 200 can include a frangible valve 201 and a pressure vessel 202, which can include a tank 203 and a valve housing 205.

Figure 6:
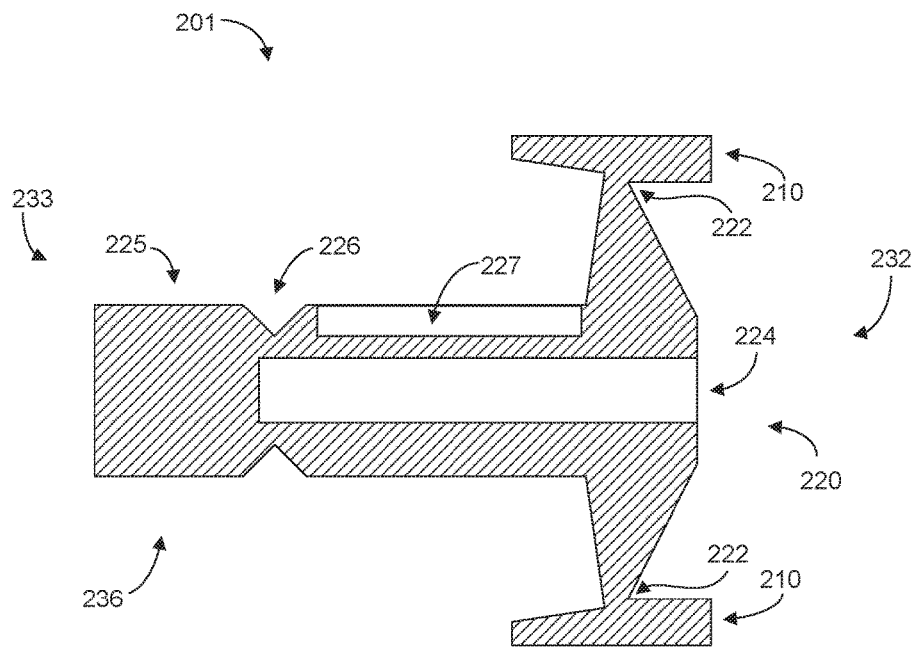
FIG. 6 is an illustration of a frangible valve of the frangible valve system of FIG. 5.

In addition, with reference to FIG. 6, and continued reference to FIG. 5, the frangible valve 201 includes an outer portion 210 and an inner portion 220. In this case, the inner portion 220 comprises a stem 223 extending from a side 233 opposite a pressure side 232 of the frangible valve 201 and a hole 224 extending partially into the stem 223 from the pressure side 232, which can be used to actively open the valve 201. The stem 223 can be configured to reside in a fluid port 209 that is in fluid communication with the channel 251 and an outlet port 208, in this case via fluid port 207. At a free end 236 of the stem 223 is a frangible tip 225 configured to break from an external force to mechanically open the frangible valve 201 by exposing the hole 224, thus releasing fluid from the pressure vessel 202. In one aspect, at least a portion of the stem 223 can be configured to contact a side of the fluid port 209 when acted on by the external force to react the force and facilitate breakage of the frangible tip 225. The frangible tip 225 can be broken in any suitable manner. For example, a ram 250 can be movable within a channel 251, which can be formed in the valve housing 205 and configured to provide the external force to break the frangible tip of the stem. The ram 250 can be caused to move by a pyrotechnic charge 252. In one aspect, the frangible tip 225 can include a reduced cross-sectional area portion 226 to facilitate breakage of the frangible tip 225 in a predetermined manner (i.e., to provide a specifically defined breakage point). The reduced cross-sectional area portion 226 can include a portion of the hole 224 to ensure that the hole 224 is exposed upon breaking the frangible tip 225. Thus, to actively open the frangible valve 201, the pyrotechnic charge 252 can be activated to cause the ram 250 to move in the channel 251 to break the frangible tip 225 and expose the hole 224.

Although it is possible to configure the pyrotechnic charge 252 to self-ignite upon reaching a predetermined temperature to prevent overpressure of the tank 203, the frangible valve 201 also includes features that provide passive overpressure protection, thus obviating the need for a self-igniting pyrotechnic charge during transport, for example. For example, as shown in FIG. 6, the inner portion 220 of the frangible valve 201 includes a separation region 222 configured to break at a predetermined fluid pressure inside the pressure vessel 202, as disclosed herein. Thus, the frangible valve 201 can be configured to passively open entirely due to the increasing fluid pressure inside the pressure vessel 202, without a structural component contacting the valve to facilitate mechanically opening the valve. The frangible valve 201 can therefore provide "vent-before-burst" functionality for a valve that is configured to be actively opened by some other means or mechanism, such as the ram 250 moved by the pyrotechnic charge 252.

Figure 7:
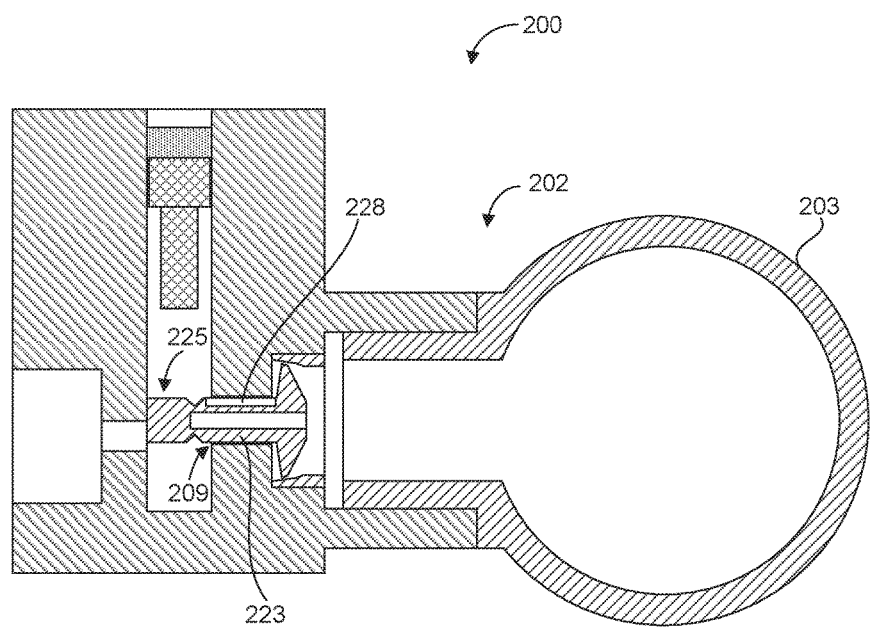
FIG. 7 is an illustration of the frangible valve system of FIG. 5 when the frangible valve is opened.

The stem 223 can be configured to facilitate venting of pressure from the pressure vessel 202 once the separation region 222 has broken or failed, causing the inner portion 220 and the stem 223 to move away from the tank 203, as shown in FIG. 7. For example, the stem can comprise an externally reduced area portion 227 (see FIG. 6) to form a fluid passageway 228 about the exterior of the stem. Thus, once opened, pressurized fluid can move through the fluid port 209 via the passageway 228 about an exterior of the stem 223 to the channel 251 and the outlet port 208. The frangible tip 225 and/or the back side of the inner portion 220 proximate the base of the stem 223 can limit the travel or motion of the "broken" or movable portion of the frangible valve 201. As shown in FIG. 7, the frangible tip 225 is in contact with a wall of the channel 251 to limit travel.

Figure 8:
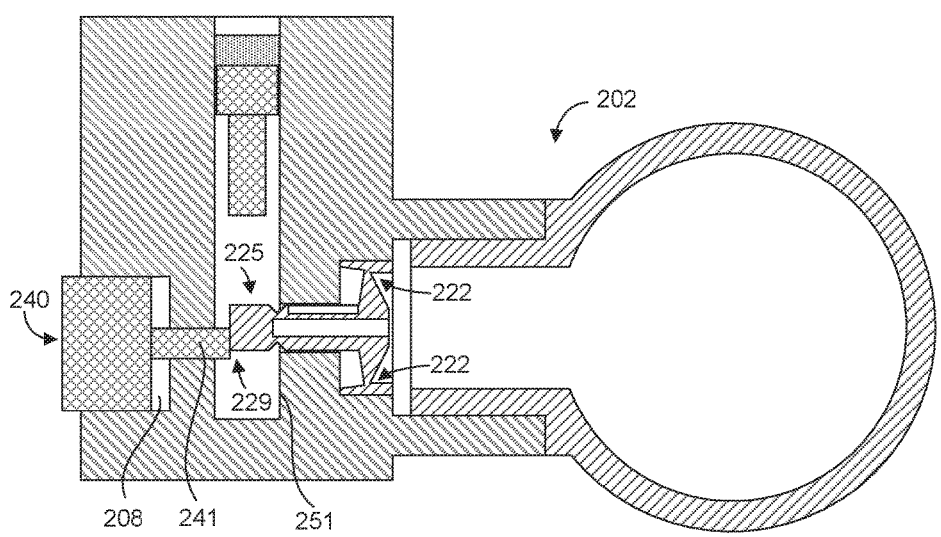
FIG. 8 is an illustration of the frangible valve system of FIG. 5 with a proofing support tool.

In one aspect, as illustrated in FIG. 8, the system 200 can include a proofing support tool 240 configured to support the inner portion 220, via the free end 229 or frangible tip 225 of the stem 223, to prevent breakage of the separation region 222 when pressure testing the pressure vessel 202 to a pressure greater than the predetermined fluid pressure. For example, the proofing support tool 240 can include an extension portion 241 configured to extend through the outlet port 208 and into the channel 251 to support the free end 229 or frangible tip 225 of the stem 223.

Figure 9A:
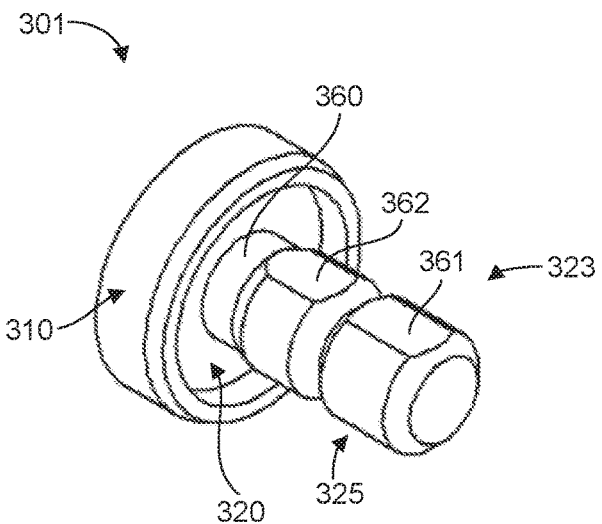
FIGS. 9A and 9B are example illustrations of a frangible valve in accordance with yet another embodiment of the present invention.
Figure 9B:
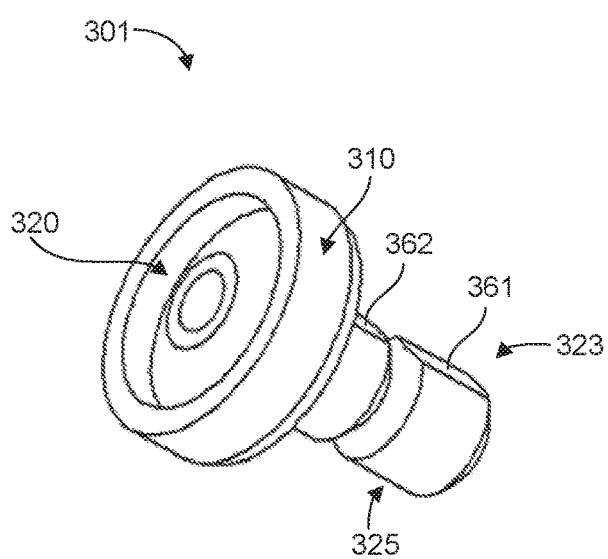

FIGS. 9A and 9B illustrate a frangible valve 301 in accordance with another example of the present disclosure. The frangible valve 301 is similar to the frangible valve 201 of FIG. 6 in many respects. For example, the frangible valve 301 includes an outer portion 310, an inner portion 320, and a stem 323 configured to extend from a side opposite a pressure side of the frangible valve 301 that includes an externally reduced area portion to form a fluid passageway about the exterior of the stem 323. In this case, the externally reduced area portion comprises a reduced area portion 360 about a base of the stem 323 and a reduced area portion 361 of a frangible tip 325, as well as a reduced area portion 362 on a main shaft portion of the stem 323. The reduced area portion 360 about the base of the stem 323 can form a fluid passageway about a circumference of the stem 323 as the fluid passes around the inner portion 320 when the valve 301 has been opened. The reduced area portions 361, 362 can form a fluid passageway for the fluid along the rest of the length of the stem. The reduced area portions 361, 362 can be configured as flats, as shown. It is also noted that the stem 323 can comprise a plurality of reduced area portions 361, 362, such as opposing flats located on opposite sides of the stem 323. Taken together, the reduced area portions 360, 361, 362 can provide a continuous fluid passageway past the valve 301, even when the inner portion 320 and stem 323 have moved due to the pressurized fluid. It should be recognized that the reduced area portions 360, 361, 362 can be of any suitable shape or configuration. Portions of the stem 323 that are not reduced in area can be configured to contact a side of a fluid port when acted on by an external force to react the force and facilitate breakage of the frangible tip 325.

In accordance with one embodiment of the present invention, a method for facilitating venting of a pressure vessel at a predetermined pressure is disclosed. The method can comprise providing a frangible valve, having an outer portion operable to form a pressure boundary for a pressure vessel, and an inner portion integrally formed with the outer portion and having a central region and a separation region about a perimeter of the central region proximate the outer portion. Additionally, the method can comprise facilitating breakage of the separation region at a predetermined fluid pressure inside the pressure vessel to vent pressure from the pressure vessel, for example, by constructing and/or utilizing the example devices and systems as discussed herein. It is noted that no specific order is required in this method, though generally in one embodiment, these method steps can be carried out sequentially.

In one aspect, of the method, the separation region can have a thickness less than a thickness of the central region to facilitate breakage. In another aspect of the method, the inner portion can comprise a stem extending from a side of the inner portion opposite the pressure vessel, and a hole extending partially into the stem from a pressure vessel side of the inner portion, and wherein a frangible tip of the stem is configured to break from an external force to expose the hole to release fluid from the pressure vessel.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A frangible valve, comprising:
   an outer portion operable to form a pressure boundary for a pressure vessel; and
   an inner portion integrally formed with the outer portion and having a central region and a separation region about a perimeter of the central region proximate the outer portion, wherein the separation region has a thickness less than a thickness of the central region and is configured to break at a predetermined fluid pressure inside the pressure vessel to vent pressure from the pressure vessel,
   wherein the inner portion comprises a stem extending from a side opposite a pressure side of the frangible valve, and a hole extending partially into the stem from the pressure side, the stem being breakable to expose the hole to release fluid from the pressure vessel.

2. The frangible valve of claim 1, wherein the stem comprises a frangible tip.

3. The frangible valve of claim 2, wherein the frangible tip includes a reduced cross-sectional area portion to facilitate breakage.

4. The frangible valve of claim 2, wherein the stem is configured to reside in a fluid port, and is configured to facilitate venting of pressure from the pressure vessel through the fluid port about an exterior of the stem.

5. The frangible valve of claim 4, wherein the stem comprises an externally reduced area portion to form a fluid passageway about the exterior of the stem.

6. The frangible valve of claim 1, wherein the outer portion comprises an annular configuration.

7. The frangible valve of claim 1, wherein the outer portion comprises an expanding taper portion to facilitate unobstructed movement of the inner portion upon breakage.

8. The frangible valve of claim 1, wherein an inner diameter of the outer portion on a back side of the frangible valve is equal to or greater than a frontal outer diameter of the inner portion to facilitate unobstructed movement of the inner portion upon breakage.

9. A frangible valve system, comprising:
   a pressure vessel; and
   a frangible valve, having
      an outer portion forming a pressure boundary for the pressure vessel, and
      an inner portion integrally formed with the outer portion and having a central region and a separation region about a perimeter of the central region proximate the outer portion, wherein the separation region has a thickness less than a thickness of the central region and is configured to break at a predetermined fluid pressure inside the pressure vessel to vent pressure from the pressure vessel,
      wherein the inner portion comprises a stem extending from a side opposite a pressure side of the frangible valve, and a hole extending partially into the stem from the pressure side, the stem being breakable to expose the hole to release fluid from the pressure vessel.

10. The system of claim 9, wherein the stem comprises a frangible tip.

11. The system of claim 10, wherein the frangible tip includes a reduced cross-sectional area portion to facilitate breakage.

12. The system of claim 10, further comprising a ram movable within a channel and configured to provide an external force to break the frangible tip of the stem.

13. The system of claim 12, wherein the stem is configured to reside in a fluid port that is in fluid communication with the channel and an outlet port, and is configured to facilitate venting of pressure from the pressure vessel through the fluid port about an exterior of the stem to the channel and the outlet port.

14. The system of claim 13, wherein the stem comprises an externally reduced area portion to form a fluid passageway about the exterior of the stem.

15. The system of claim 13, wherein at least a portion of the stem is configured to contact a side of the fluid port when acted on by the external force to react the force.

16. A method for facilitating venting of a pressure vessel at a predetermined pressure, comprising:
   providing a frangible valve, having
      an outer portion operable to form a pressure boundary for a pressure vessel, and
      an inner portion integrally formed with the outer portion and having a central region and a separation region about a perimeter of the central region proximate the outer portion, the inner portion further comprising a stem extending from a side opposite a pressure side of the frangible valve, and a hole extending partially into the stem from the pressure side; and
   facilitating breakage of the separation region at a predetermined fluid pressure inside the pressure vessel to vent pressure from the pressure vessel.

17. The method of claim 16, wherein the separation region has a thickness less than a thickness of the central region to facilitate breakage.

18. The method of claim 16, wherein the stem comprises a frangible tip breakable from an external force to expose the hole to release fluid from the pressure vessel.

19. The method of claim 16, wherein facilitating breakage comprises breaking a portion of the stem to expose the hole.

* * * * *